(12) United States Patent
Kawasaki et al.

(10) Patent No.: US 12,013,192 B2
(45) Date of Patent: Jun. 18, 2024

(54) VALVE DEVICE HAVING OUTER CIRCUMFERENTIAL SURFACE HAVING COMMUNICATION HOLE AND GROOVE

(71) Applicant: MIKUNI CORPORATION, Tokyo (JP)

(72) Inventors: Takuya Kawasaki, Odawara (JP); Toshiaki Fujitani, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 377 days.

(21) Appl. No.: 17/188,031

(22) Filed: Mar. 1, 2021

(65) Prior Publication Data
US 2021/0341235 A1 Nov. 4, 2021

(30) Foreign Application Priority Data
May 1, 2020 (JP) ................................. 2020-080891

(51) Int. Cl.
*F28F 27/02* (2006.01)
*F16K 3/26* (2006.01)
*F16K 11/076* (2006.01)

(52) U.S. Cl.
CPC ............. *F28F 27/02* (2013.01); *F16K 3/26* (2013.01); *F16K 11/076* (2013.01)

(58) Field of Classification Search
CPC .......... F28F 27/02; F16K 3/26; F16K 11/076; F16K 5/10; F16K 5/12; F16K 39/045
See application file for complete search history.

(56) References Cited

U.S. PATENT DOCUMENTS

| 762,936 A | * | 6/1904 | Paige | ................. F16K 37/0016 251/207 |
| 3,557,821 A | * | 1/1971 | Siegel | ................... F16K 15/044 251/146 |
| 4,699,358 A | * | 10/1987 | Iqbal | ..................... F16K 5/0414 251/117 |

(Continued)

FOREIGN PATENT DOCUMENTS

| JP | S532726 A | 1/1978 |
| JP | 2014177979 A | 9/2014 |

(Continued)

OTHER PUBLICATIONS

Examination Report issued in Indian Appln. No. 202114012762, dated Aug. 16, 2023.

(Continued)

*Primary Examiner* — Travis Ruby
(74) *Attorney, Agent, or Firm* — ROSSI, KIMMS & McDOWELL LLP

(57) ABSTRACT

A valve device 1 includes a rotational shaft 2, and a valve body 4 internally forming a space 10 and rotatable about the rotational shaft 2, the valve body 4 having an outer circumferential surface 28 where a first communication hole 36 and a bottomed groove 38 are formed, the first communication hole 36 communicating with the space 10, the bottomed groove 38 extending from the first communication hole 36 toward one side in a rotational direction of the rotational shaft 2, and the groove 38 including a first section 40 in which at least one of a depth D of the groove 38 and a width W of the groove 38 increases toward the first communication hole 36.

13 Claims, 14 Drawing Sheets

(56) References Cited

U.S. PATENT DOCUMENTS

| | | | | |
|---|---|---|---|---|
| 4,881,718 | A * | 11/1989 | Champagne | F16K 5/0605 251/316 |
| 4,993,453 | A * | 2/1991 | McHugh | A62C 35/68 251/315.01 |
| 5,009,393 | A * | 4/1991 | Massey | F16K 15/12 251/207 |
| 5,349,983 | A * | 9/1994 | Ozarowski | F16K 5/10 251/312 |
| 5,372,224 | A * | 12/1994 | Samonil | F16F 9/468 188/282.3 |
| 5,524,863 | A * | 6/1996 | Davis | B08B 9/00 251/127 |
| 6,021,812 | A * | 2/2000 | Iwamoto | F16K 5/12 137/625.3 |
| 6,520,481 | B2 * | 2/2003 | Harneit | F23N 1/007 251/207 |
| 6,880,571 | B2 * | 4/2005 | Lin | F16K 5/0214 137/599.17 |
| 8,262,062 | B2 * | 9/2012 | Kamo | F16K 5/0428 251/286 |
| 2003/0205685 | A1 | 11/2003 | Whang | |
| 2008/0029730 | A1 | 2/2008 | Kamo et al. | |
| 2014/0264127 | A1 | 9/2014 | Yokoyama | |
| 2018/0149073 | A1 | 5/2018 | Shen et al. | |

FOREIGN PATENT DOCUMENTS

| | | |
|---|---|---|
| JP | 2019184075 A | 10/2019 |
| WO | 2013130908 A1 | 9/2013 |

OTHER PUBLICATIONS

Office Action issued in Japanese Appln. No. 2020-080891, mailed Mar. 5, 2024. English machine translation provided.

* cited by examiner

VALVE DEVICE HAVING OUTER CIRCUMFERENTIAL SURFACE HAVING COMMUNICATION HOLE AND GROOVE

TECHNICAL FIELD

The present disclosure relates to a valve device, a cooling water control device, and a cooling water circuit.

BACKGROUND

Some valve devices open/close a flow passage by rotating a valve body. In some of such valve devices, the flow rate of a fluid flowing through the flow passage increases by an increase in range where an opening formed in the valve body and an opening of the flow passage overlap as a rotation angle of the valve body increases.

In order to control a flow rate in a range where a rotation angle early in opening of a valve is small (low opening range), Patent Document 1 discloses a valve device which includes a flow rate maintaining means disposed on a valve body, for constantly maintaining the flow rate regardless of a value of the rotation angle in a range from the start of opening of the valve to a predetermined rotation angle.

CITATION LIST

Patent Literature

Patent Document 1: JP2014-177979A

SUMMARY

However, the valve device described in Patent Document 1 cannot highly accurately change the flow rate in the low opening range.

The present disclosure was made in view of the above, and an object of the present disclosure is to provide a valve device capable of highly accurately changing a flow rate in a low opening range.

(1) A valve device according to at least one embodiment of the present disclosure includes a rotational shaft, and a valve body internally forming a space and rotatable about the rotational shaft, the valve body having an outer circumferential surface where a first communication hole and a bottomed groove are formed, the first communication hole communicating with the space, the bottomed groove extending from the first communication hole toward one side in a rotational direction of the rotational shaft, and the groove including a first section in which at least one of a depth of the groove and a width of the groove increases toward the first communication hole.

(2) In some embodiments, in the valve device according to the above configuration (1), the depth of the groove may increase toward the first communication hole in the first section.

(3) In some embodiments, in the valve device according to the above configuration (2), the groove may include a second section in which the depth of the groove is constant.

(4) In some embodiments, in the valve device according to the above configuration (1), the width of the groove may increase toward the first communication hole in the first section.

(5) In some embodiments, in the valve device according to the above configuration (4), the groove may include a second section in which the width of the groove is constant.

(6) In some embodiments, in the valve device according to any one of the above configuration (1), the first section may be an entirety of a range in which the groove is formed in the rotational direction.

(7) In some embodiments, in the valve device according to the above configuration (1), as viewed from an axis direction of the rotational shaft, an angle formed by a virtual first straight line and a virtual second straight line may be not greater than 15 degrees, the virtual first straight line passing through an axis of the rotational shaft and one end of the groove in the rotational direction, the virtual second straight line passing through the axis of the rotational shaft and the other end of the groove in the rotational direction.

(8) In some embodiments, in the valve device according to the above configuration (1), in the outer circumferential surface of the valve body, a second communication hole communicating with the space may further be formed.

(9) In some embodiments, in the valve device according to the above configuration (8), in the outer circumferential surface of the valve body, a groove extending from the second communication hole toward the one side in the rotational direction of the rotational shaft may not be formed.

(10) In some embodiments, a cooling water control device may include a flow passage where cooling water of an engine flows, and the valve device according to the above configuration (1) disposed on the flow passage.

(11) In some embodiments, a cooling water circuit may include the valve device according to the above configuration (8), a radiator connection flow passage for connecting the valve device and a radiator, and a heater connection flow passage for connecting the valve device and a heater, the first communication hole and the bottomed groove may be configured to allow the radiator connection flow passage and the space to communicate with each other, and the second communication hole may be configured to allow the heater connection flow passage and the space to communicate with each other.

According to at least one embodiment of the present disclosure, it is possible to provide a valve device capable of highly accurately changing a flow rate in a low opening range.

DETAILED DESCRIPTION

Figure 1:
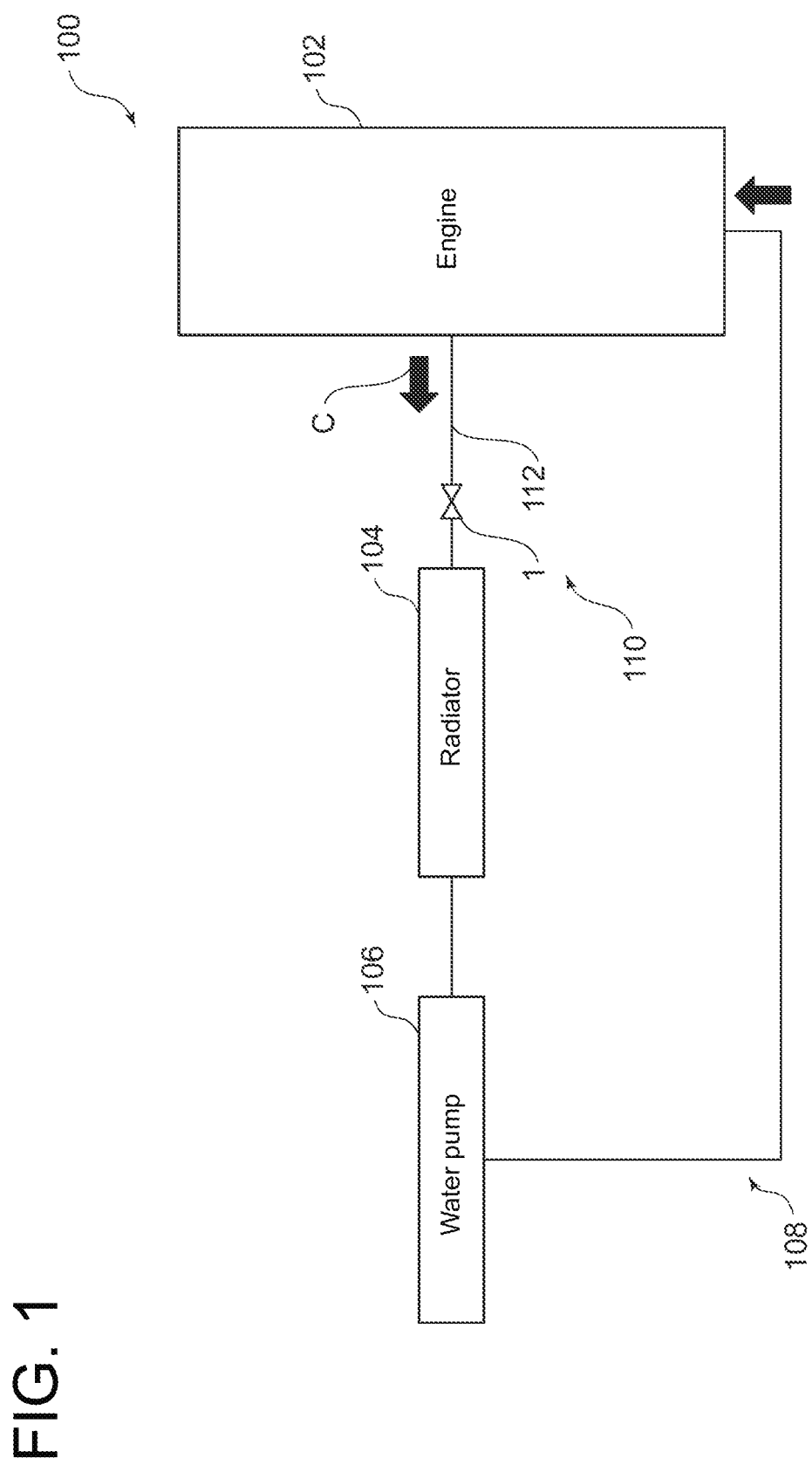
FIG. 1 is a schematic configuration diagram of a cooling water circuit including a cooling water control device according to the first embodiment of the present disclosure.

An embodiment of the present disclosure will now be described with reference to the accompanying drawings. It is intended, however, that unless particularly identified, dimensions, materials, shapes, relative positions and the like of components described in the embodiments or shown in the drawings shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

First Embodiment

As shown in FIG. 1, a cooling water circuit 100 includes an engine 102, a radiator 104, a water pump 106, and a cooling water control device 110 with a flow passage 108 where cooling water C of the engine 102 flows. The radiator 104 and the water pump 106 are disposed on the flow passage 108. Such a cooling water circuit 100 is a circuit for flowing the cooling water C flowing out of the engine 102 through the radiator 104, the water pump 106, and the engine 102 in this order. The cooling water C is, for example, an LLC (Long Life Coolant) containing ethylene glycol as a major ingredient.

Moreover, as shown in FIG. 1, the cooling water control device 110 includes a valve device 1 disposed on the flow passage 108. In the present embodiment, the valve device 1 is disposed on a radiator flow passage 112 of the flow passage 108 connecting the engine 102 and the radiator 104. That is, in the present embodiment, the cooling water control device 110 has a function of controlling the flow rate of the cooling water C supplied to the radiator 104. The configuration of the valve device 1 in the cooling water control device 110 will be described below. In the present disclosure, a description will be given by taking a case in which the valve device 1 is applied to the cooling water control device 110 as an example. However, the valve device 1 may be applied to a fluid control device for controlling the flow rate of a fluid other than the cooling water C.

Figure 2:
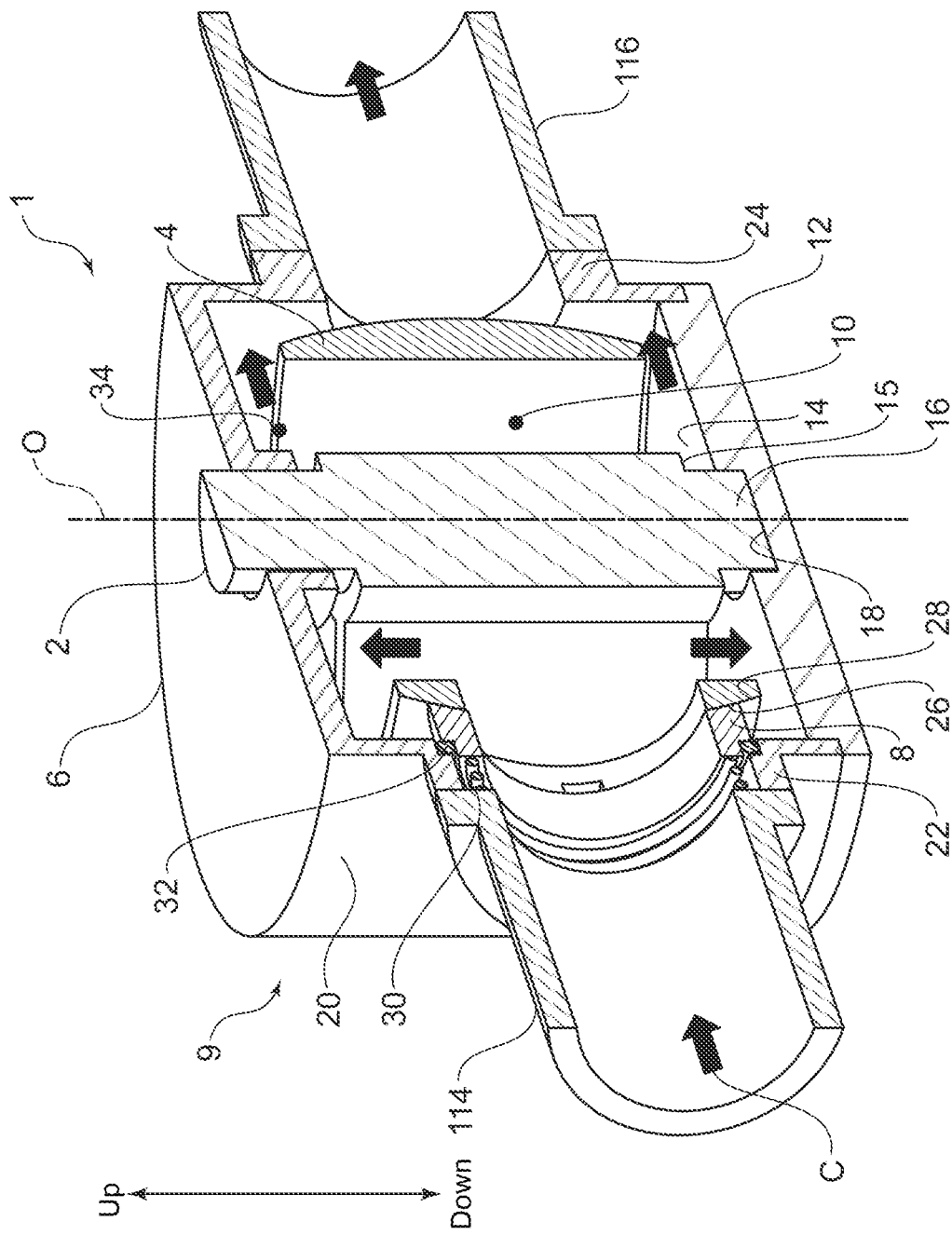
FIG. 2 is a cutout cross-sectional view showing the overall configuration of a valve device according to the first embodiment of the present disclosure.

The configuration of the valve device 1 according to the first embodiment of the present disclosure will be described. As shown in FIG. 2, the valve device 1 includes a rotational shaft 2, a valve body 4, a casing 6, and a valve seat 8. The valve body 4 has a tubular shape and internally forms a space (to be referred to as a flow space 10, hereinafter). The rotational shaft 2 is inserted through the flow space 10 of the valve body 4. The rotational shaft 2 and the valve body 4 are fixed to each other, the rotational shaft 2 rotates, and the valve body 4 rotates about the rotating rotational shaft 2. The rotational shaft 2 and the valve body 4 may integrally be formed. In this case, it is only necessary to prepare one component including the rotational shaft 2 and the valve body 4. Moreover, the rotational shaft 2 is connected to a motor (not shown) and is rotated by a rotational force generated by the motor.

In the present disclosure, an axis direction in which an axis O of the rotational shaft 2 extends will be referred to as an "up-down direction", one side of the axis direction will be referred to as "up", and the other side of the axis direction will be referred to as "down". Further, the rotational direction of the rotational shaft 2 will simply be referred to as a "rotational direction". Furthermore, a radial direction of a circle drawn on a plane orthogonal to the axis O around the axis O of the rotational shaft 2 (the radial direction of the rotational shaft 2) will be referred to as a "radial direction".

The casing 6 houses the rotational shaft 2, the valve body 4, and the valve seat 8. Moreover, the casing 6 opens downward. The opening of the casing 6 is blocked by a cover part 12 having a plate-like shape. The casing 6 and the cover part 12 constitute a housing 9 for covering the rotational shaft 2, the valve body 4, and the valve seat 8. In an upper surface 14 of the cover part 12, a recess 18 for fitting a protrusion 16 protruding from a lower end surface 15 of the rotational shaft 2 is formed.

Moreover, the casing 6 includes an inlet portion 22 protruding radially outward from an outer circumferential surface 20 of the casing 6 and an outlet portion 24 protruding radially outward from the outer circumferential surface 20 of the casing 6 in a direction different from a protruding direction of the inlet portion 22. The inlet portion 22 is connected to an upstream radiator flow passage 114 of the radiator flow passage 112 on a side closer to the engine 102 than the valve device 1. The outlet portion 24 is connected to a downstream radiator flow passage 116 of the radiator flow passage 112 on a side closer to the radiator 104 than the valve device 1. The cooling water C flows into the valve device 1 from the upstream radiator flow passage 114 via the inlet portion 22 and flows out to the downstream radiator flow passage 116 from the valve device 1 via the outlet portion 24. In the present embodiment, the inlet portion 22 is positioned opposite to the outlet portion 24 across the rotational shaft 2. However, the present disclosure is not limited to the present embodiment.

The valve seat 8 is arranged radially outward relative to the valve body 4. In the present embodiment, the valve seat 8 is arranged on a side closer to the engine 102 than the valve body 4 (upstream). The valve seat 8 has a tubular shape and is configured to allow the cooling water C to flow. The valve seat 8 has a radially inner end surface 26 slidably in contact with an outer circumferential surface 28 of the valve body 4. Moreover, the valve seat 8 is pressed against the outer circumferential surface 28 of the valve body 4 by a spring 30 arranged between the valve seat 8 and the upstream radiator flow passage 114. Moreover, a seal member 32 having a ring shape is fitted between the casing 6 and the valve seat 8. In the present disclosure, the description is given by taking the case in which the valve seat 8 is arranged on the side closer to the engine 102 than the valve body 4 as an example. However, the valve seat 8 may be arranged on a side closer to the radiator 104 than the valve body 4.

Figure 3:
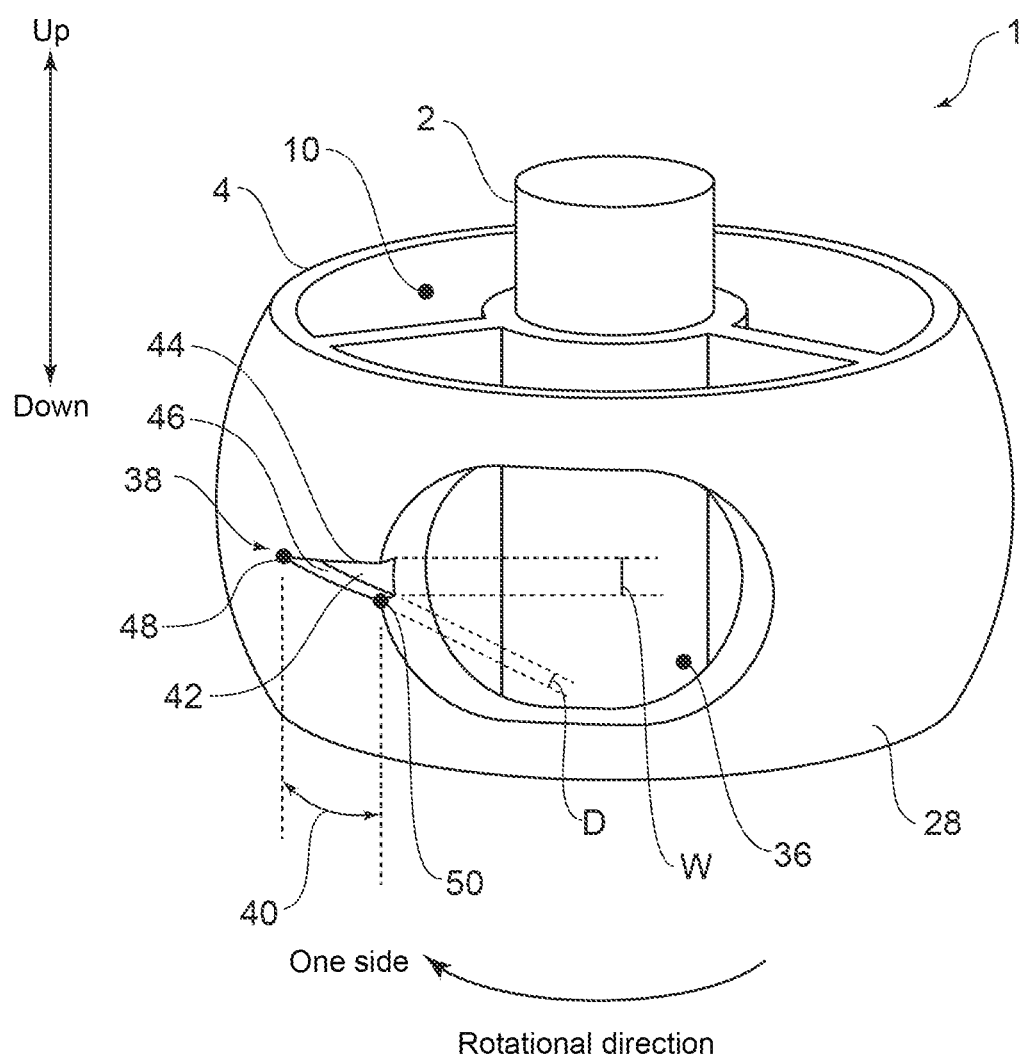
FIG. 3 is a perspective view showing the configuration of a valve body of the valve device according to the first embodiment of the present disclosure.

As shown in FIG. 3, in the outer circumferential surface 28 of the valve body 4, a first communication hole 36 communicating with the flow space 10 is formed. The first communication hole 36 is a long hole having a longitudinal shape in the rotational direction and is configured as a through hole penetrating the valve body 4 in the radial direction. In the present embodiment, with reference to FIG. 2, the upper end and the lower end of the valve body 4 are opened. Thus, the cooling water C flowing into the flow space 10 from the inlet portion 22 flows into a gap 34 formed between the valve body 4 and the casing 6, and between the valve body 4 and the cover part 12 via the opening of the upper end or the lower end of the valve body 4. Then, the cooling water C flowing into the gap 34 flows out of the valve device 1 to the downstream radiator flow passage 116 via the outlet portion 24.

Moreover, as shown in FIG. 3, in the outer circumferential surface 28 of the valve body 4, a bottomed groove 38 extending from the first communication hole 36 toward one side in the rotational direction is formed. In the present embodiment, the groove 38 is positioned one side of the first communication hole 36 in the rotational direction such that the groove 38 starts to overlap the opening of the valve seat 8 upon a rotation of the rotational shaft 2, and the first communication hole 36 also starts to overlap the opening of the valve seat 8 upon a further rotation of the rotational shaft 2. A state in which only the groove 38 overlaps the opening of the valve seat 8 (a state in which the groove 38 overlaps the opening of the valve seat 8, and the first communication hole 36 does not overlap the opening of the valve seat 8) corresponds to a "low opening range".

In the present embodiment, the groove 38 has a bottom surface 42 facing radially outward, an upper surface 44 facing downward, and a lower surface 46 facing upward. Thus, in the present disclosure, a width W of the groove 38 means a size of a gap formed between the upper surface 44 and the lower surface 46 in the up-down direction. Moreover, a depth D of the groove 38 means a depth recessed radially inward from the outer circumferential surface 28 of the valve body 4.

The groove 38 includes a first section 40 in which the width W of the groove 38 increases toward the first communication hole 36. Moreover, in the configuration shown in FIG. 3, the depth D of the groove 38 in the first section 40 is constant. The first section 40 is an entirety of a range in which the groove 38 is formed in the outer circumferential surface 28 of the valve body 4 in the rotational direction.

Figure 4:
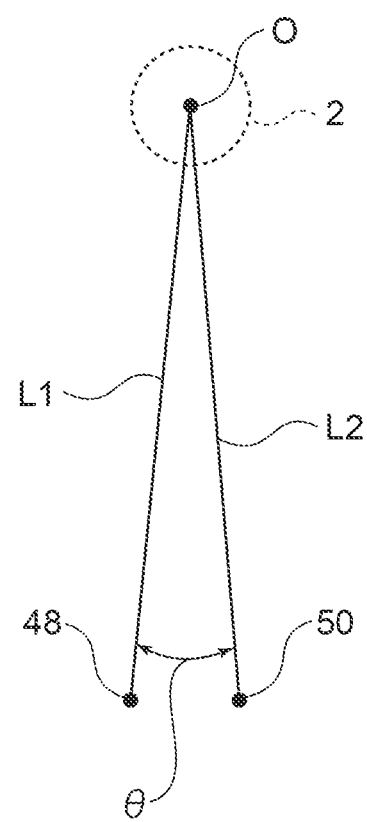
FIG. 4 is an explanatory view for describing the configuration of a groove according to the first embodiment of the present disclosure.

Moreover, as shown in FIG. 4, as viewed from a direction of the axis O of the rotational shaft 2, a virtual straight line passing through the axis O of the rotational shaft 2 and one end 48 of the groove 38 in the rotational direction will be referred to as a first straight line L1, and a virtual straight line passing through the axis O of the rotational shaft 2 and the other end 50 of the groove 38 in the rotational direction will be referred to as a second straight line L2. The first straight line L1 and the second straight line L2 form an angle θ of not greater than 15 degrees. In the present embodiment, the angle θ is 10 degrees.

(Operation/Effect)

Figure 5:
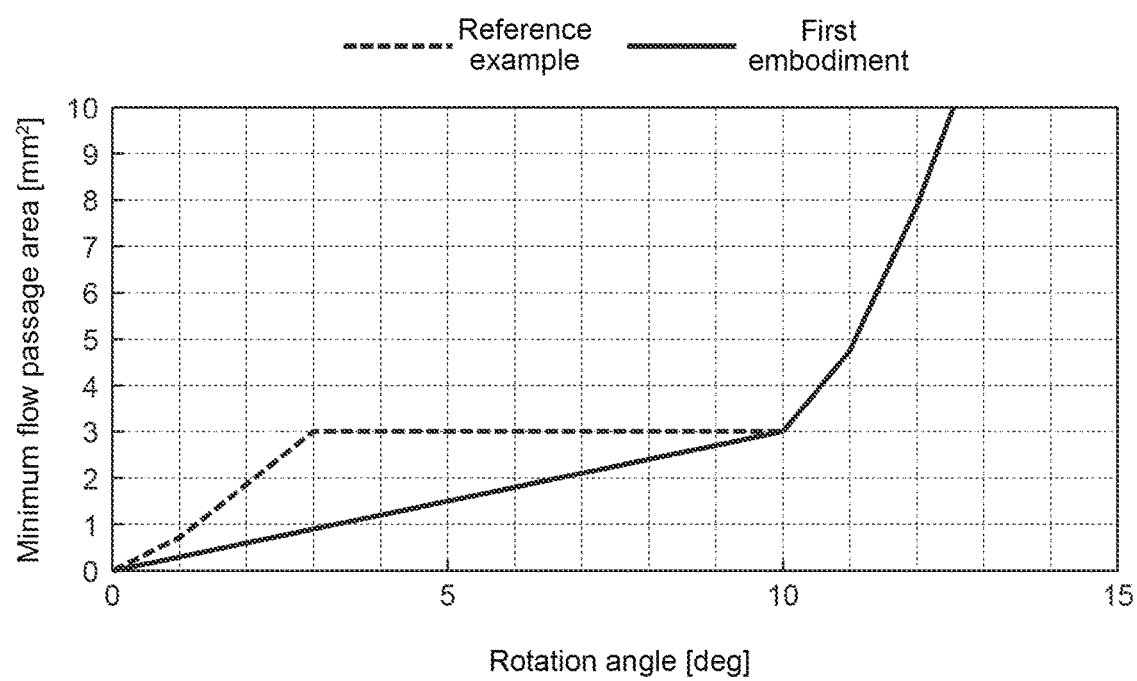
FIG. 5 is a graph for describing an effect of the valve device according to the first embodiment of the present disclosure, and is a graph showing the relationship between a rotation angle and a minimum flow passage area.

The operation/effect of the valve device 1 according to the first embodiment of the present disclosure will be described. FIG. 5 shows the relationship between the rotation angle and a minimum flow passage area in the present disclosure. The rotation angle is an angle increasing/decreasing by the rotation of the rotational shaft 2, and the valve device 1 is closed when the rotation angle is 0 degrees. The valve device 1 starts to open when the rotation angle increases from 0 degrees. In 0 degrees<rotation angle≤10 degrees, only the groove 38 overlaps the opening of the valve seat 8, which is in the state of the above-described low opening range. In 10 degrees<rotation angle, the state is obtained in which the first communication hole 36 overlaps the opening of the valve seat 8. Moreover, the minimum flow passage area is a smallest flow passage area of flow passage areas of respective flow passage cross-sections of the flow passage where the cooling water C flows from the opening of the valve seat 8 to the flow space 10. Moreover, in FIG. 5, a case in which the depth D of the groove 38 and the width W of the groove 38 are constant (to be referred to as a reference example, hereinafter) is indicated by a dotted line, and a case in which the depth D of the groove 38 is constant and the width W of the groove 38 increases toward the first communication hole 36 (first embodiment) is indicated by a solid line.

As shown in FIG. 5, in the reference example, in 0 degrees<rotation angle≤3 degrees, an area in which the groove 38 overlaps the opening of the valve seat 8 (an area in which the opening of the valve seat 8 and the groove 38 overlap as viewed from the radial direction) increases as the rotation angle increases, and thus the minimum flow passage area also increases. In 3 degrees<rotation angle≤10 degrees as well, the area in which the groove 38 overlaps the opening of the valve seat 8 increases as the rotation angle increases, but the minimum flow passage area is maintained constant. This is because in 3 degrees<rotation angle≤10 degrees, the flow passage area of the flow passage decided by the constant depth D of the groove 38 and the constant width W of the groove 38 is smaller than the area in which the groove 38 overlaps the opening of the valve seat 8. Thus, in the reference example, in 0 degrees<rotation angle≤3 degrees, an increased amount of the flow rate of the cooling water C supplied to the radiator 104 is large. If the rotation angle exceeds 10 degrees, the first communication hole 36 starts to overlap the opening of the valve seat 8, and the area in which the opening of the valve seat 8 and the first communication hole 36 overlap (the area in which the opening of the valve seat 8 and the first communication hole 36 overlap as viewed from the radial direction) is dominant over the minimum flow passage area.

According to the first embodiment, the bottomed groove 38 extending from the first communication hole 36 toward one side in the rotational direction of the rotational shaft 2 includes the first section 40 in which the width W of the groove 38 increases toward the first communication hole 36. Thus, as shown in FIG. 5, compared with the reference example, it is possible to smoothen a change in minimum flow passage area in the low opening range, and to highly accurately change the flow rate of the cooling water C supplied to the radiator 104 in the low opening range. Moreover, in the case in which the bottomed groove 38 extending from the first communication hole 36 toward one side in the rotational direction of the rotational shaft 2 is formed in the outer circumferential surface 28 of the valve body 4, compared with a case in which a minute opening extending from the first communication hole 36 toward one side in the rotational direction of the rotational shaft 2 (a minute opening penetrating the valve body 4 in the radial direction) is formed, it is possible to suppress generation of a portion with a thin width in a mold where the valve body 4 is to be molded, and to suppress breakage by improving durability of the mold.

Moreover, according to the first embodiment, the first section 40 is the entirety of the range in which the groove 38 is formed in the rotational direction. Thus, as shown in FIG. 5, it is possible to smoothen the change in minimum flow passage area in the low opening range (the range from 0 degrees to 10 degrees in FIG. 5), and to highly accurately change the flow rate of the cooling water C supplied to the radiator 104 in the low opening range.

Moreover, according to the first embodiment, since the depth D of the groove 38 is constant in the first section 40, it is possible to highly accurately change the flow rate of the cooling water C supplied to the radiator 104 in the low opening range just by adjusting the width W of the groove 38 in the low opening range.

Moreover, according to the first embodiment, as described with reference to FIG. 4, the angle θ formed by the first straight line L1 and the second straight line L2 is not greater than 15 degrees. Thus, it is possible to dispose the groove 38 in the low opening range, and to highly accurately change the flow rate of the cooling water C in a stage in which the cooling water C starts to be supplied to the radiator 104.

Moreover, according to the first embodiment, the cooling water control device 110 includes the valve device 1. Thus, the cooling water control device 110 is provided which is capable of highly accurately changing the flow rate of the cooling water C supplied to the radiator 104 in the low opening range.

In the first embodiment, the width W of the groove 38 increases toward the first communication hole 36 in the first section 40. However, the present disclosure is not limited to the present embodiment. As exemplified in the second embodiment to be described later, the depth D of the groove 38 may increase toward the first communication hole 36 in the first section 40. Moreover, as exemplified in the third embodiment to be described later, the width W of the groove 38 and the depth D of the groove 38 may increase toward the first communication hole 36 in the first section 40.

Moreover, in the first embodiment, the description is given by taking the case in which the groove 38 opens to the upstream radiator flow passage 114 in the low opening range as an example. However, the groove 38 may open to the downstream radiator flow passage 116 in the low opening range. That is, the flow rate of the cooling water C may be controlled on a flowout side of the valve device 1.

Second Embodiment

The valve device 1 according to the second embodiment of the present disclosure will be described with reference to FIG. 6. The second embodiment has a structure of the groove 38 which is different from that of the groove 38 described in the first embodiment. However, other configurations are the same as the configurations described in the first embodiment. In the second embodiment, the same constituent elements as those in the first embodiment are associated with the same reference characters and not described again in detail.

Figure 6:
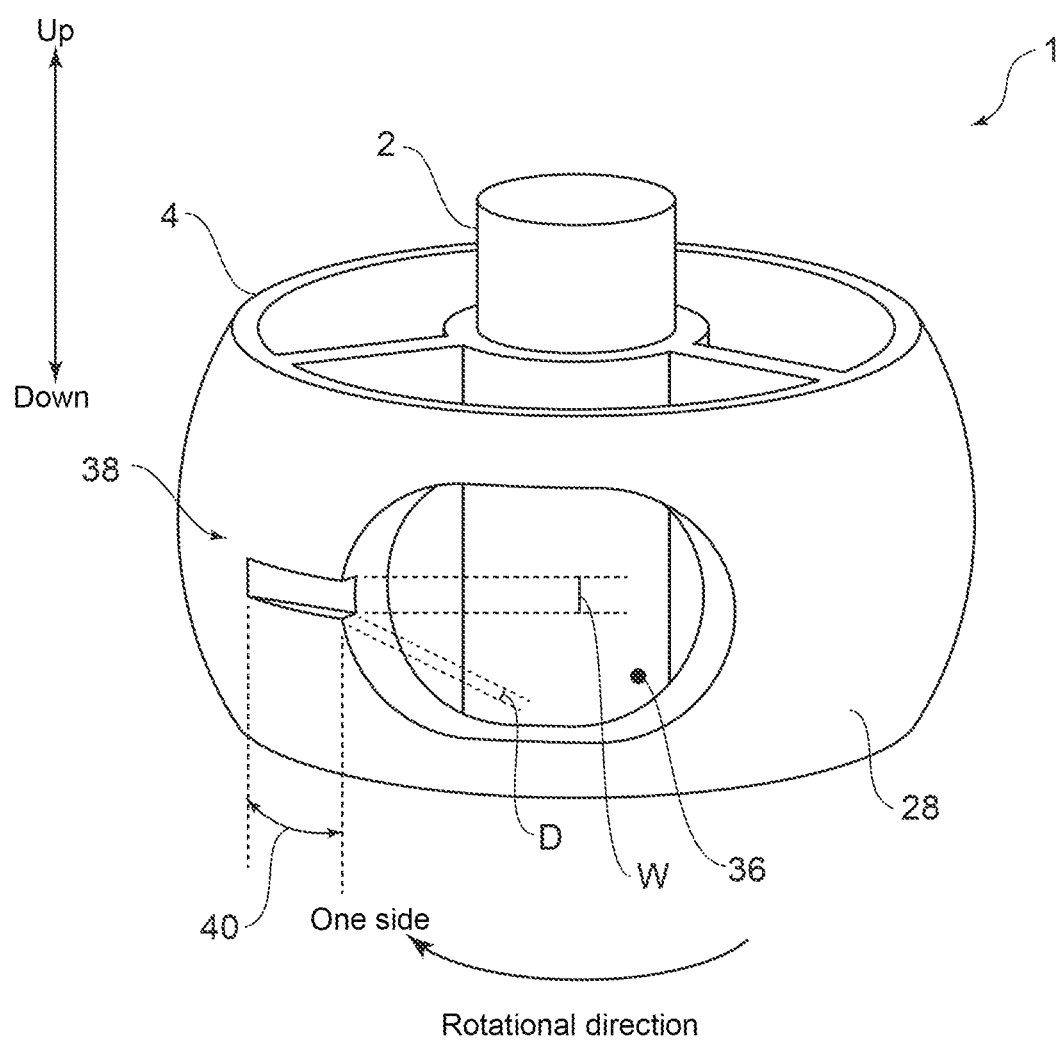
FIG. 6 is a perspective view showing the configuration of the valve body of the valve device according to the second embodiment of the present disclosure.

As shown in FIG. 6, the groove 38 includes the first section 40 in which the depth D of the groove 38 increases toward the first communication hole 36. Moreover, in the configuration shown in FIG. 6, the width W of the groove 38 in the first section 40 is constant. The first section 40 is the entirety of the range in which the groove 38 is formed in the outer circumferential surface 28 of the valve body 4 in the rotational direction.

Figure 7:
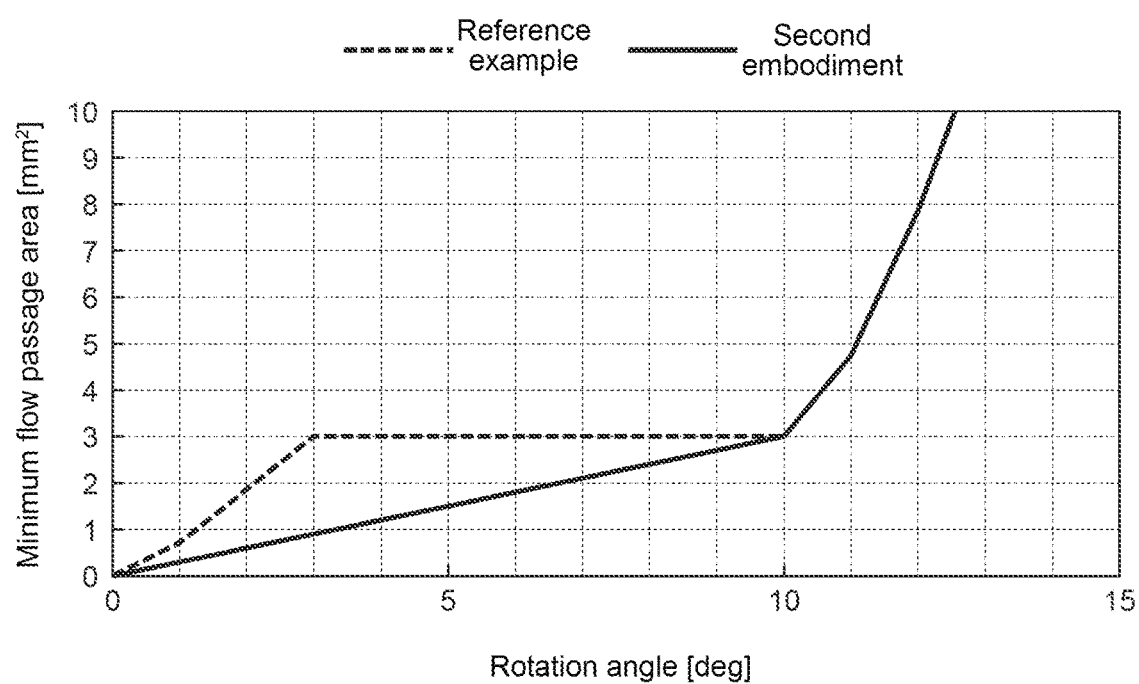
FIG. 7 is a graph for describing an effect of the valve device according to the second embodiment of the present disclosure, and is a graph showing the relationship between the rotation angle and the minimum flow passage area.

According to the second embodiment, the bottomed groove 38 extending from the first communication hole 36 toward one side in the rotational direction of the rotational shaft 2 includes the first section 40 in which the depth D of the groove 38 increases toward the first communication hole 36. Thus, as shown in FIG. 7, compared with the above-described reference example, it is possible to smoothen the change in minimum flow passage area in the low opening range, and to highly accurately change the flow rate of the cooling water C supplied to the radiator 104 in the low opening range.

Moreover, according to the second embodiment, since the width W of the groove 38 is constant in the first section 40, it is possible to highly accurately change the flow rate of the cooling water C supplied to the radiator 104 in the low opening range just by adjusting the depth D of the groove 38 in the low opening range.

Third Embodiment

The valve device 1 according to the third embodiment of the present disclosure will be described with reference to FIG. 8. The third embodiment has a structure of the groove 38 which is different from that of the groove 38 described in the first embodiment. However, other configurations are the same as the configurations described in the first embodiment. In the third embodiment, the same constituent elements as those in the first embodiment are associated with the same reference characters and not described again in detail.

Figure 8:
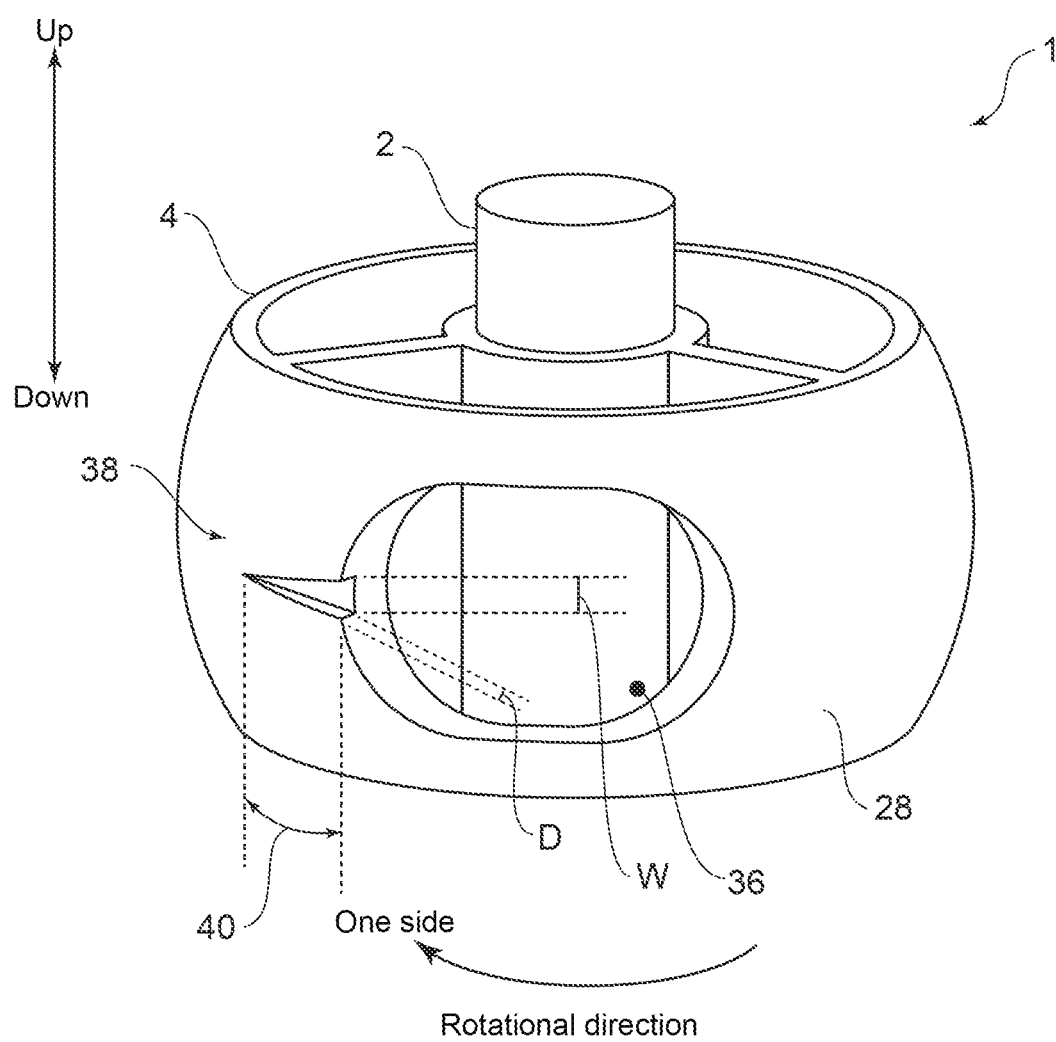
FIG. 8 is a perspective view showing the configuration of the valve body of the valve device according to the third embodiment of the present disclosure.

As shown in FIG. 8, the groove 38 includes the first section 40 in which the depth D of the groove 38 and the width W of the groove 38 increase toward the first communication hole 36. The first section 40 is the entirety of the range in which the groove 38 is formed in the outer circumferential surface 28 of the valve body 4 in the rotational direction.

Figure 9:
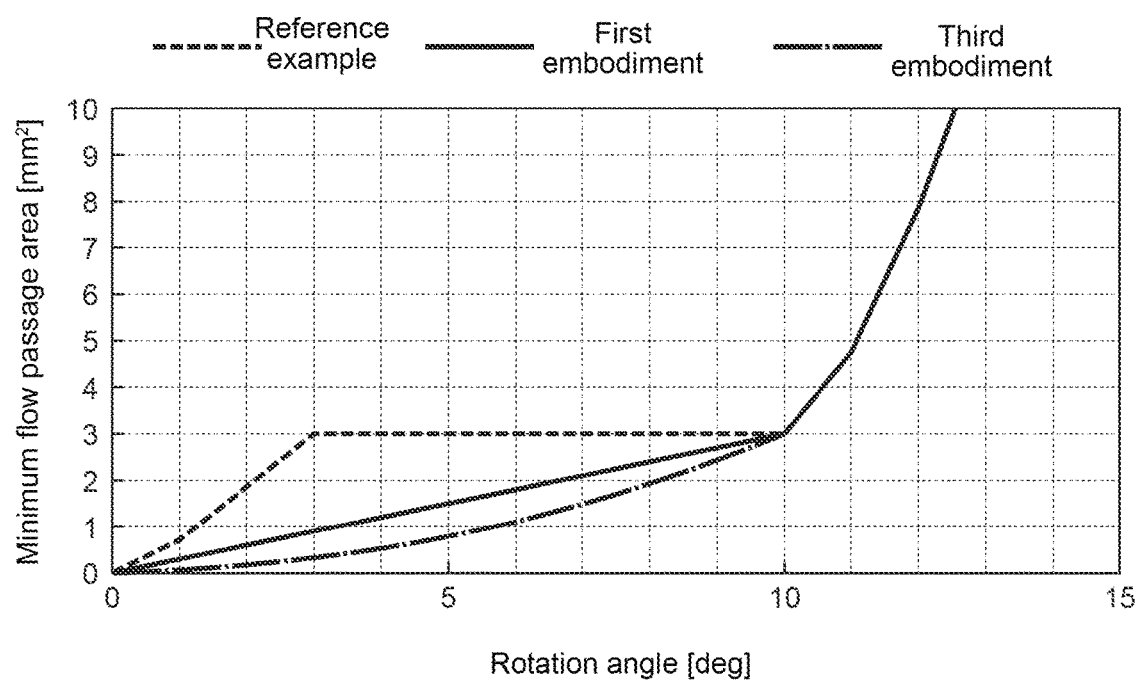
FIG. 9 is a graph for describing an effect of the valve device according to the third embodiment of the present disclosure, and is a graph showing the relationship between the rotation angle and the minimum flow passage area.

According to the third embodiment, the groove 38 includes the first section 40 in which the depth D of the groove 38 and the width W of the groove 38 increase toward the first communication hole 36. Thus, as shown in FIG. 9, compared with the first embodiment, it is possible to further smoothen the change in minimum flow passage area in the low opening range, and to highly accurately change the flow rate of the cooling water C supplied to the radiator 104 in the low opening range. FIG. 9 shows the minimum flow passage area of the third embodiment by a single-dotted chain line.

Fourth Embodiment

The valve device 1 according to the fourth embodiment of the present disclosure will be described with reference to FIG. 10. The fourth embodiment has a structure of the groove 38 which is different from that of the groove 38 described in the first embodiment. However, other configurations are the same as the configurations described in the first embodiment. In the fourth embodiment, the same constituent elements as those in the first embodiment are associated with the same reference characters and not described again in detail.

Figure 10:
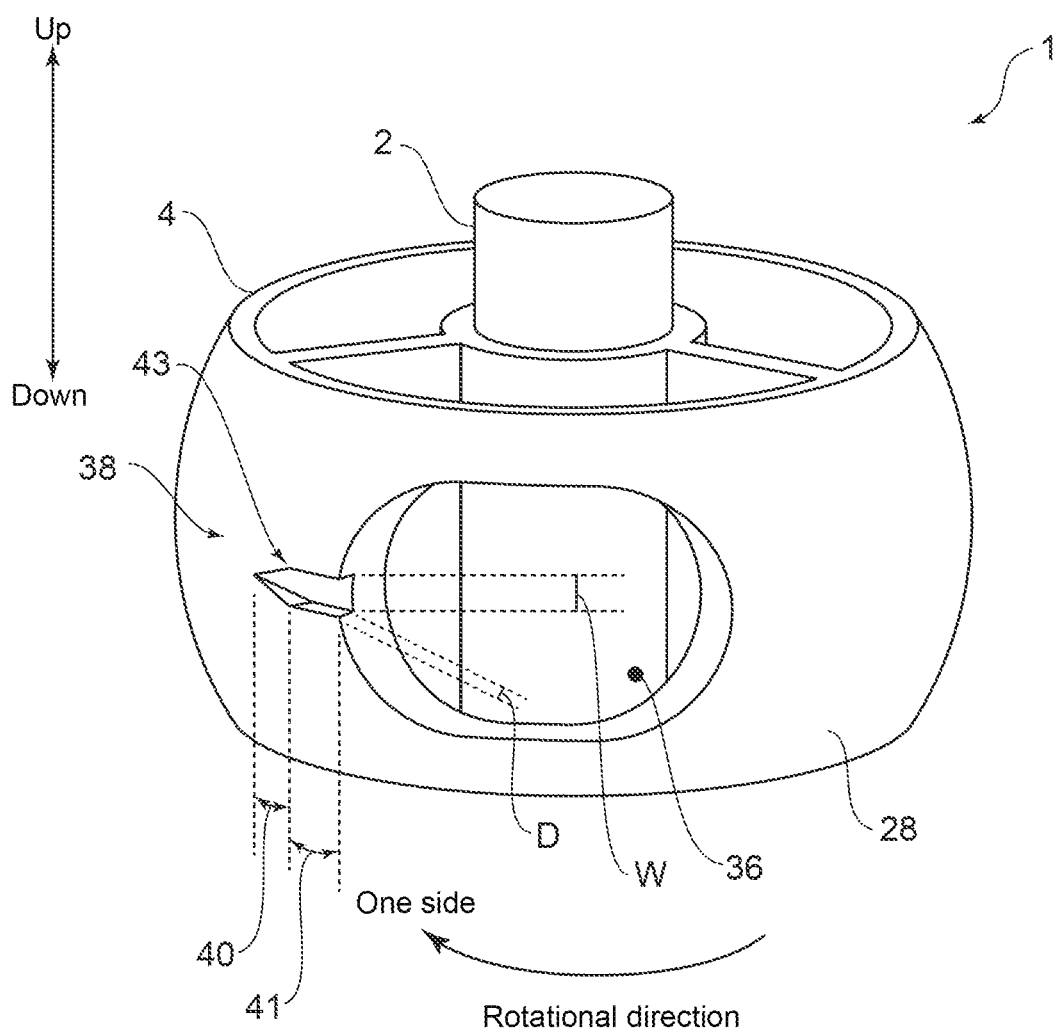
FIG. 10 is a perspective view showing the configuration of the valve body of the valve device according to the fourth embodiment of the present disclosure.

As shown in FIG. 10, the groove 38 includes the first section 40 in which the depth D of the groove 38 and the width W of the groove 38 increase toward the first communication hole 36. Moreover, the groove 38 includes a second section 41 in which the depth D of the groove 38 and the width W of the groove 38 are constant. In the present embodiment, the first section 40 is positioned on one side of the second section 41 in the rotational direction, and the first section 40 and the second section 41 are adjacent to each other in the rotational direction. The depth D of the groove 38 in the first section 40 and the depth D of the groove 38 in the second section 41 are the same at a boundary 43 between the first section 40 and the second section 41. Moreover, the width W of the groove 38 in the first section 40 and the width W of the groove 38 in the second section 41 are the same at the boundary 43 between the first section 40 and the second section 41. Moreover, the groove 38 is formed by only the first section 40 and the second section 41.

Figure 11:
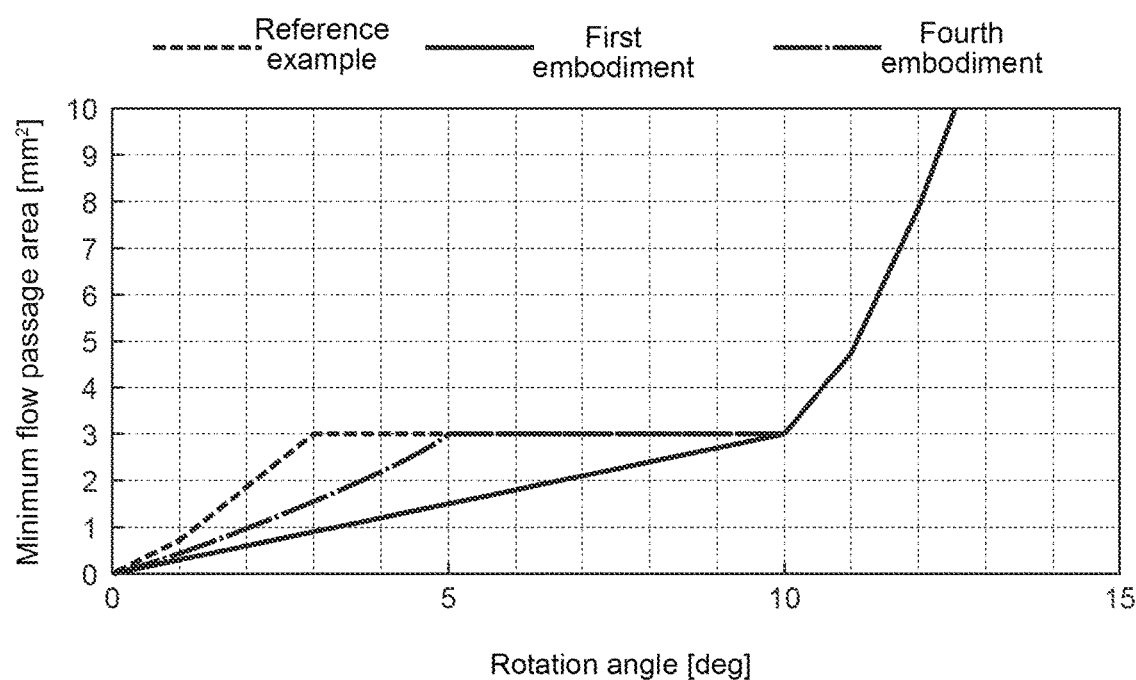
FIG. 11 is a graph for describing an effect of the valve device according to the fourth embodiment of the present disclosure, and is a graph showing the relationship between the rotation angle and the minimum flow passage area.

According to the fourth embodiment, a portion (first section 40) capable of smoothly increasing the minimum flow passage area as the rotation angle increases and a portion (second section 41) capable of constantly maintaining the minimum flow passage area even if the rotation angle increases are formed in the low opening range. Thus, as shown in FIG. 11, it is possible to implement both an opening range in which the flow rate of the cooling water C supplied to the radiator 104 is highly accurately changed and an opening range in which the flow rate is constantly maintained, in the low opening range. In the fourth embodiment, the first section 40 is positioned on one side of the second section 41 in the rotational direction. However, the present disclosure is not limited to the present embodiment. For example, the first section 40 may be positioned on another side of the second section 41 in the rotational direction. Moreover, FIG. 11 shows the minimum flow passage area of the fourth embodiment by a single-dotted chain line.

The valve device 1 according to the first to fourth embodiments of the present disclosure has been described above. However, the present disclosure is not limited to the above embodiments, and various modifications can be applied as long as they do not depart from the object of the present disclosure.

For example, the valve device 1 may control the flow rate of the cooling water C supplied to a device other than the radiator 104. The device other than the radiator 104 is, for example, a transmission, an oil cooler, a heater, an EGR, a throttle, or the like.

Moreover, one valve device 1 may be configured to adjust the flow rate of the cooling water C supplied to each of a plurality of devices. For example, the valve device 1 may be configured to adjust the flow rate of the cooling water C supplied to each of the radiator 104 and the heater 118.

Figure 12:
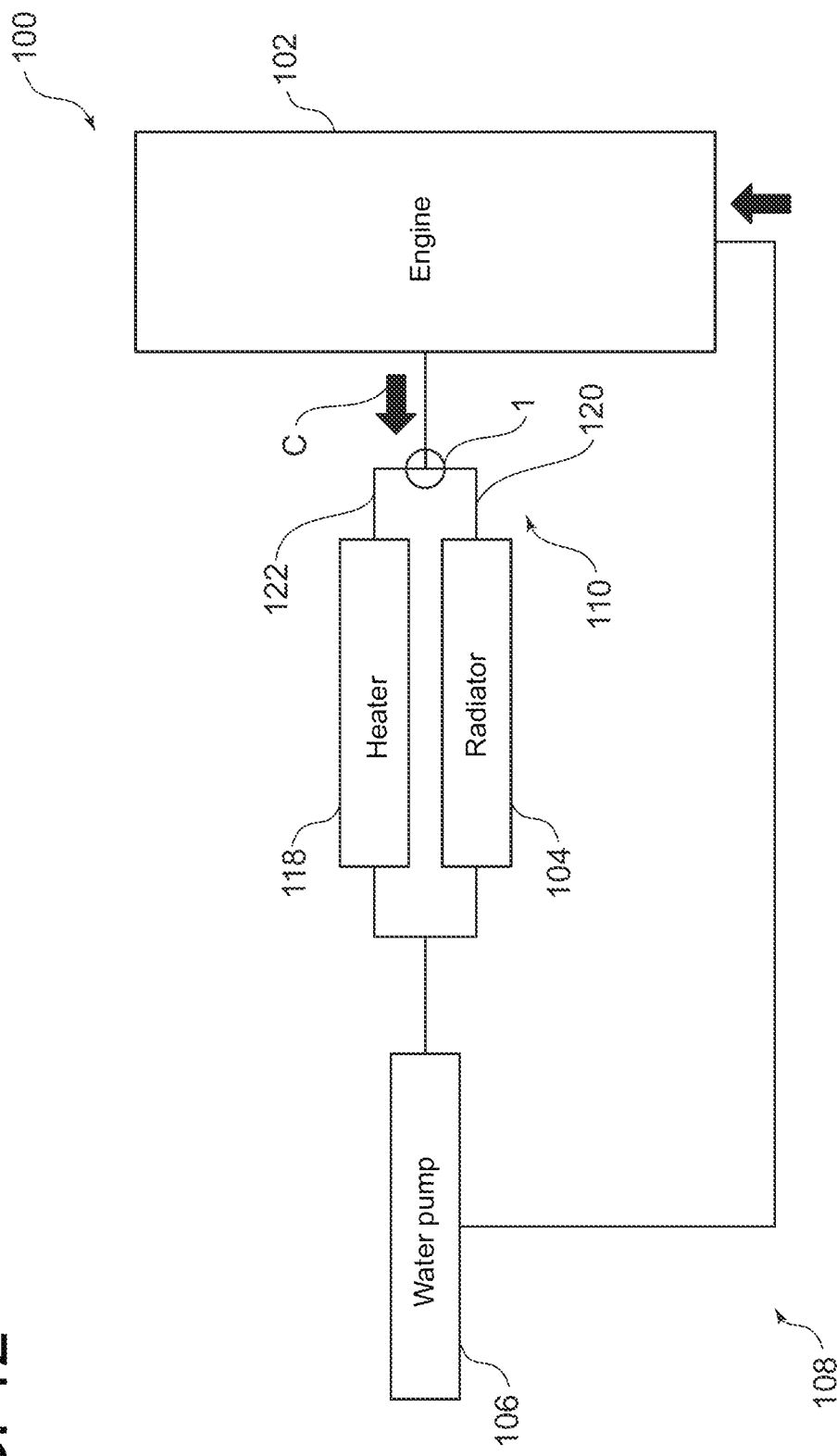
FIG. 12 is a schematic configuration diagram of the cooling water circuit according to another embodiment of the present disclosure.
Figure 13:
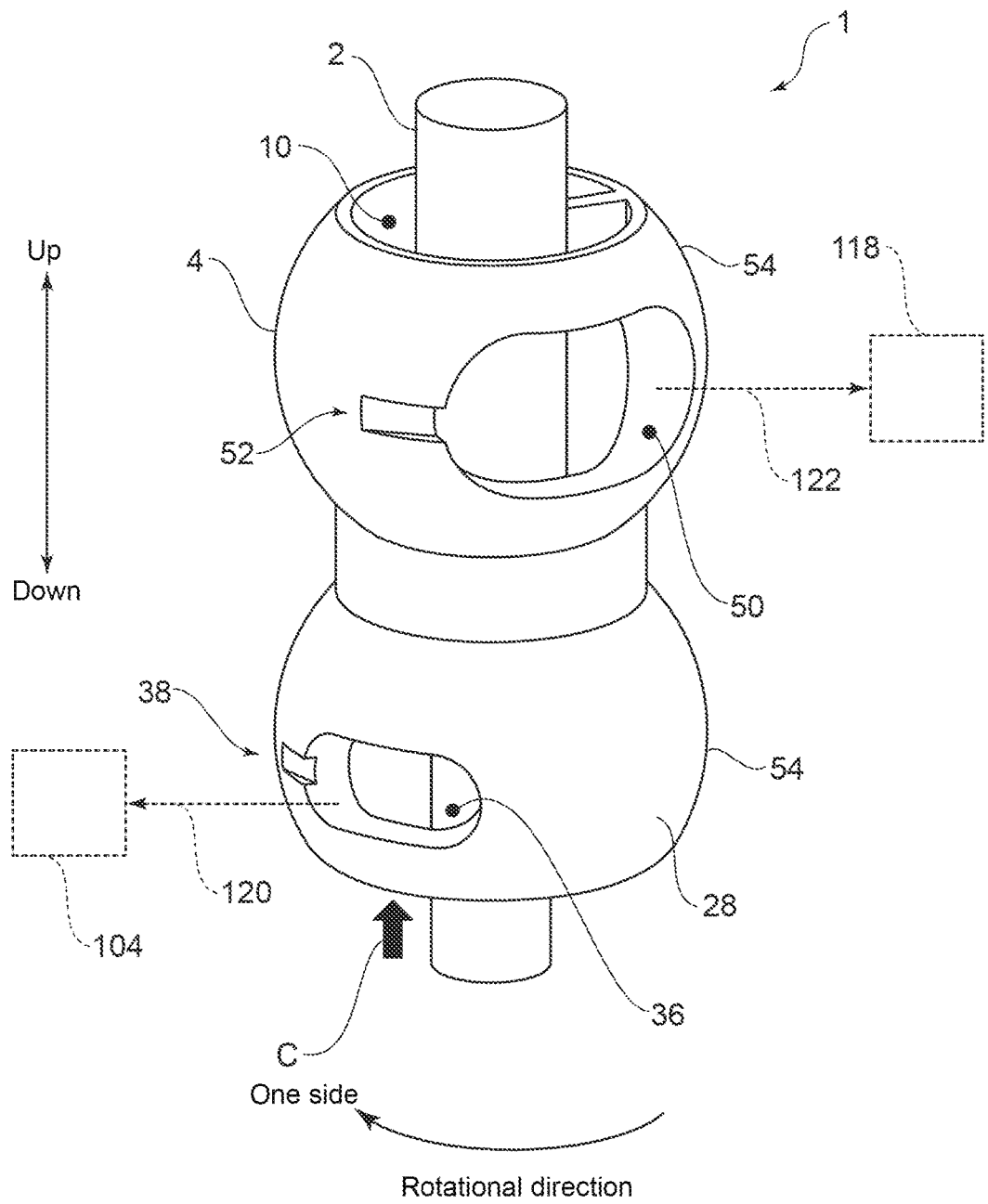
FIG. 13 is a perspective view showing the configuration of the valve body of the valve device according to another embodiment of the present disclosure.

In some embodiments, as shown in FIG. 12, the cooling water circuit 100 further includes the heater 118 disposed on the flow passage 108. The flow passage 108 of the cooling water circuit 100 includes a radiator connection flow passage 120 (corresponding to the above-described downstream radiator flow passage 116) for connecting the valve device 1 and the radiator 104, and a heater connection flow passage 122 for connecting the valve device 1 and the heater 118. Moreover, in this case, as shown in FIG. 13, in the outer circumferential surface 28 of the valve body 4 in the valve device 1, a second communication hole 50 communicating with the flow space 10 is further formed, in addition to the first communication hole 36 described above. The second communication hole 50 is a long hole having a longitudinal shape in the rotational direction and is configured as a through hole penetrating the valve body 4 in the radial direction. In the embodiment shown in FIG. 13, in the outer circumferential surface 28 of the valve body 4, a bottomed second groove 52 extending from the second communication hole 50 toward one side in the rotational direction is formed.

The first communication hole 36 and the bottomed groove 38 are configured to be able to communicate with the radiator connection flow passage 120. More specifically, in the low opening range of the valve device 1 relative to the radiator connection flow passage 120, the radiator connection flow passage 120 communicates with the flow space 10 via the groove 38 and the first communication hole 36. If the valve body 4 rotates to one side in the rotational direction beyond the low opening range of the valve device 1 relative to the radiator connection flow passage 120, the radiator connection flow passage 120 communicates with the flow space 10 via the first communication hole 36, without via the groove 38.

Likewise, the second communication hole 50 is configured to be able to communicate with the heater connection flow passage 122. More specifically, in the low opening range of the valve device 1 relative to the heater connection flow passage 122, the heater connection flow passage 122 communicates with the flow space 10 via the second groove 52 and the second communication hole 50. Then, if the valve body 4 rotates to one side in the rotational direction beyond the low opening range of the valve device 1 relative to the heater connection flow passage 122, the heater connection flow passage 122 communicates with the flow space 10 via the second communication hole 50, without via the second groove 52. The low opening range in which an opening degree of the valve device 1 relative to the heater connection flow passage 122 is low corresponds to a state in which only the second groove 52 overlaps an opening of a valve seat (not shown) (a state in which the second groove 52 overlaps the opening of the valve seat, and the second communication hole 50 does not overlap the opening of the valve seat).

Moreover, in the embodiment shown in FIG. 13, the first communication hole 36 and the second communication hole 50 are different in position in the up-down direction. The rotational shaft 2 and the valve body 4 are fixed to each other, and once the rotational shaft 2 rotates, the valve body 4 rotates with the rotating rotational shaft 2. The first communication hole 36 is arranged off the second communication hole 50 in the rotational direction. Moreover, the valve body 4 includes two tubular members 54, 54 arranged at different positions, respectively, in the up-down direction. Of the two tubular members 54, 54, the tubular member 54 arranged on a lower side forms the first communication hole 36 and the groove 38, and the tubular member 54 arranged on an upper side forms the second communication hole 50 and the second groove 52.

In the embodiment shown in FIG. 13, the cooling water C flows into the flow space 10 via the lower end of the valve body 4, and flows out of the flow space 10 via the first communication hole 36 and/or the groove 38, or via the second communication hole 50 and/or the second groove 52.

Thus, in the case in which the valve device 1 adjusts the flow rate of the cooling water C supplied to each of the plurality of devices, as in a form exemplified in FIG. 13, the first communication hole 36 and the second communication hole 50 may be provided with the groove 38 and the second groove 52, respectively.

Figure 14:
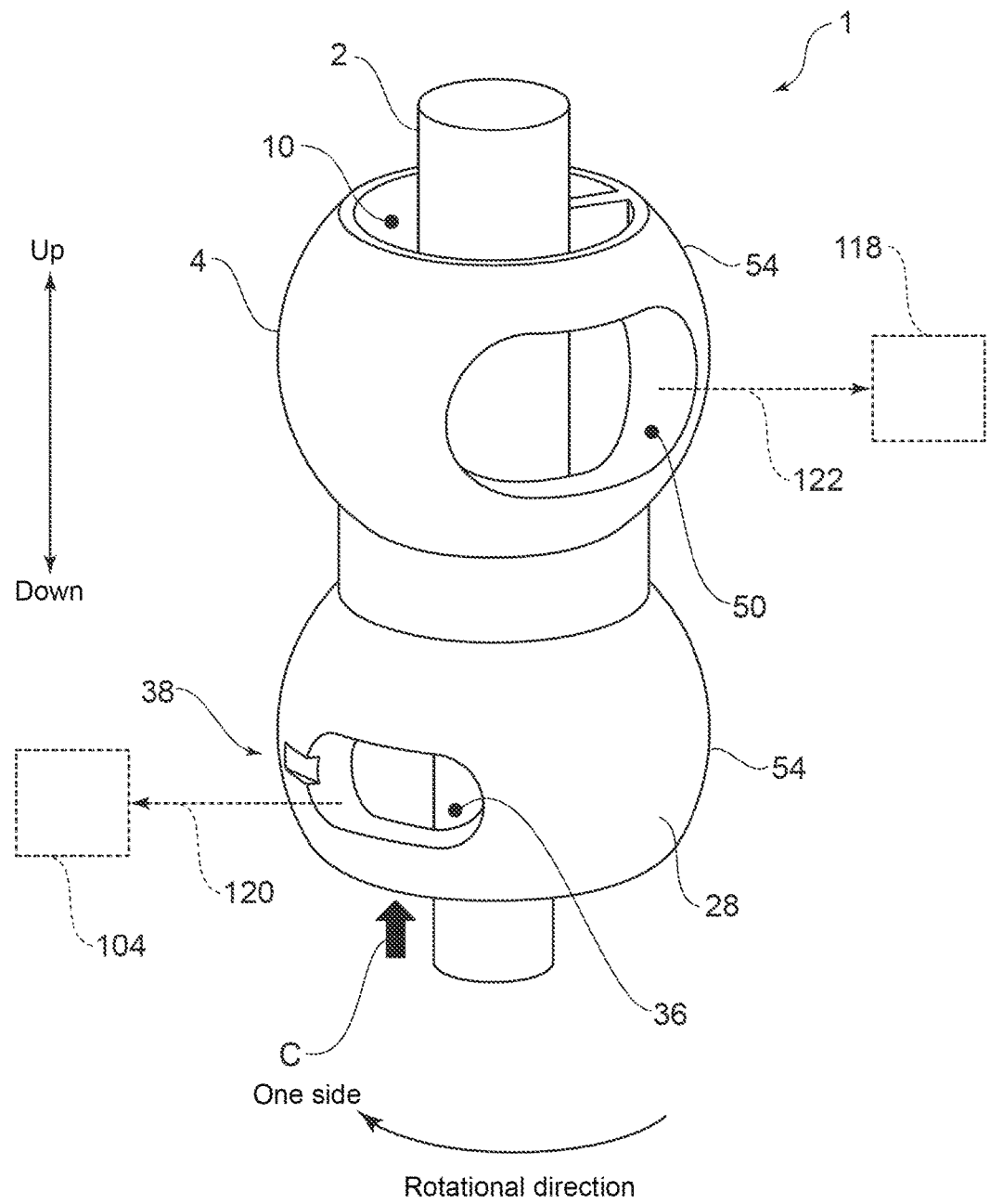
FIG. 14 is a perspective view showing the configuration of the valve body of the valve device according to still another embodiment of the present disclosure.

Alternatively, only one communication hole of a plurality of communication holes may be provided with a groove. In some embodiments, as shown in FIG. 14, in the outer circumferential surface 28 of the valve body 4, the second groove 52 extending from the second communication hole 50 to one side in the rotational direction of the rotational shaft 2 is not formed. The configuration shown in FIG. 14 is different from the configuration shown in FIG. 13 only in that the second groove 52 is not formed in the outer circumferential surface 28 of the valve body 4, and other configurations are the same as the configurations shown in FIG. 13. Accordingly, the same constituent elements as those in FIG. 13 are associated with the same reference characters and not described again in detail.

The radiator 104 is cooled, and may thus be broken by a thermal shock unless the cooling water C is supplied at the low flow rate when supply of the cooling water C to the radiator is started. Thus, forming the groove 38 and the first communication hole 36 each having the shape as shown in FIG. 3, 6, 8, or 10 in the outer circumferential surface 28 of the valve body 4, it is possible to reduce the supply amount of the cooling water C to the radiator 104 in the low opening range and to suppress breakage in the radiator 104. On the other hand, the heater 118 is less likely to be broken even if supply of the cooling water C is started. Thus, it is possible to easily manufacture the valve device 1 by not forming the second groove 52 in the outer circumferential surface 28 of the valve body 4. Moreover, since the second groove 52 need not be formed in the outer circumferential surface 28 of the valve body 4, it is possible to suppress an increase in length of the outer circumference of the valve body 4 and to downsize the valve device 1. Therefore, according to the configuration shown in FIG. 14, it is possible to highly accurately change the flow rate in the low opening range relative to the radiator 104, to suppress breakage in the radiator 104, and to implement easy manufacture and downsizing of the valve device 1.

The invention claimed is:

1. A valve device, comprising:
   a rotational shaft;
   a valve body internally forming a space and rotatable about the rotational shaft; and
   a casing accommodating the rotational shaft, the valve body, and a valve seat and including an inlet portion and an outlet portion protruding radially outward,
   the valve body having an outer circumferential surface where a first communication hole and a bottomed groove are formed, the first communication hole communicating with the space, the bottomed groove extending from the first communication hole toward one side in a rotational direction of the rotational shaft, and
   the groove including a first section in which at least one of a depth of the groove and a width of the groove increases toward the first communication hole,
   wherein a minimum flow passage area of the valve device:
   increases continuously with an increase of a rotation angle of the valve body in a low opening range of the valve device where the first section of the groove determines the minimum flow passage area; and
   increases more rapidly than in the low opening range with a further increase of the rotation angle of the valve body from an angular position corresponding to an upper limit of the low opening range,
   wherein the valve body has a first opening at an upper end of the valve body and a second opening at a lower end of the valve body, and
   wherein fluid flowing into the space formed in the valve body, via the groove or the first communication hole, from the inlet portion is directed to a gap formed between the valve body and the casing through at least one of the first opening and the second opening and is discharged from the outlet portion via the gap.

2. The valve device according to claim 1, wherein the depth of the groove increases toward the first communication hole in the first section.

3. The valve device according to claim 2, wherein the groove includes a second section in which the depth of the groove is constant.

4. The valve device according to claim 1, wherein the width of the groove increases toward the first communication hole in the first section.

5. The valve device according to claim 4, wherein the groove includes a second section in which the width of the groove is constant.

6. The valve device according to claim 1, wherein the first section is an entirety of a range in which the groove is formed in the rotational direction.

7. The valve device according to claim 1, wherein, as viewed from an axis direction of the rotational shaft, an angle formed by a virtual first straight line and a virtual second straight line is not greater than 15 degrees, the virtual first straight line passing through an axis of the rotational shaft and one end of the groove in the rotational direction, the virtual second straight line passing through the axis of the rotational shaft and the other end of the groove in the rotational direction.

8. The valve device according to claim 1, wherein, in the outer circumferential surface of the valve body, a second communication hole communicating with the space is further formed.

9. The valve device according to claim 8, wherein, in the outer circumferential surface of the valve body, a groove extending from the second communication hole toward the one side in the rotational direction of the rotational shaft is not formed.

10. A cooling water control device, comprising:
    a flow passage where cooling water of an engine flows; and
    the valve device according to claim 1 disposed on the flow passage.

11. A cooling water circuit, comprising:
    the valve device according to claim 8;
    a radiator connection flow passage for connecting the valve device and a radiator; and
    a heater connection flow passage for connecting the valve device and a heater,
    wherein the first communication hole and the bottomed groove are configured to allow the radiator connection flow passage and the space to communicate with each other, and
    wherein the second communication hole is configured to allow the heater connection flow passage and the space to communicate with each other.

12. The valve device according to claim 1, wherein the valve seat has a tubular shape and is arranged radially outward relative to the valve body such that an axis of the tubular shape extends along a radial direction of the valve body, the valve seat including a radially inner end surface slidably in contact with the outer circumferential surface of the valve body, and wherein the first communication hole is an elongated hole having a longitudinal shape in the rotational direction.

13. The valve device according to claim 12, further comprising:

a seal member placed between the inlet portion of the casing and the valve seat.

\* \* \* \* \*